(12) United States Patent
Guo et al.

(10) Patent No.: US 11,215,555 B2
(45) Date of Patent: Jan. 4, 2022

(54) TERAHERTZ SPECTRUM TEST DEVICE AND SYSTEM

(71) Applicants: Shenzhen Institute of Terahertz Technology and Innovation Co., Ltd., Guangdong (CN); Shenzhen Institute of Terahertz Technology and Innovation, Guangdong (CN)

(72) Inventors: Cui Guo, Guangdong (CN); Yi Pan, Guangdong (CN); Zhanqiang Xue, Guangdong (CN)

(73) Assignees: SHENZHEN INSTITUTE OF TERAHERTZ TECHNOLOGY AND INNOVATION CO., LTD., Guangdong (CN); SHENZHEN INSTITUTE OF TERAHERTZ TECHNOLOGY AND INNOVATION, Guangdong (CN)

( * ) Notice: Subject to any disclaimer, the term of this patent is extended or adjusted under 35 U.S.C. 154(b) by 117 days.

(21) Appl. No.: 16/727,093

(22) Filed: Dec. 26, 2019

(65) Prior Publication Data

US 2020/0209154 A1 Jul. 2, 2020

(30) Foreign Application Priority Data

Dec. 26, 2018 (CN) .......................... 201811601929.4

(51) Int. Cl.
*G01N 21/3586* (2014.01)
*G01N 21/39* (2006.01)

(52) U.S. Cl.
CPC ......... *G01N 21/3586* (2013.01); *G01N 21/39* (2013.01); *G01N 2021/396* (2013.01)

(58) Field of Classification Search
CPC .................................................. G01N 21/3586
See application file for complete search history.

(56) References Cited

U.S. PATENT DOCUMENTS

| | | | | |
|---|---|---|---|---|
| 2009/0303480 A1* | 12/2009 | Tamada | ................ | G01J 3/0205 356/369 |
| 2019/0120757 A1* | 4/2019 | Watanabe | .......... | G01N 21/3586 |
| 2020/0103341 A1* | 4/2020 | Ochiai | ............... | G01N 21/3586 |

* cited by examiner

*Primary Examiner* — Yara B Green
(74) *Attorney, Agent, or Firm* — Panitch Schwarze Belisario & Nadel LLP

(57) ABSTRACT

A terahertz spectrum test device and system includes a femtosecond fiber laser configured to generate a pump light and a probe light. The pump light excites a terahertz transmitter to generate terahertz waves which are transmitted to a sample suspension device to irradiate a suspended to-be-tested sample, and the probe light is directly transmitted to a terahertz detector. The terahertz detector receives the terahertz waves transmitted from the sample suspension device, and then transmits the terahertz waves and the probe light together to a signal processing circuit to obtain a corresponding terahertz time-domain spectrum. By adoption of the terahertz spectrum test device and system, the to-be-tested sample need not be fixed with a clamp or other instruments, so that terahertz waves will not irradiate to the instrument used for fixing the to-be-tested sample during a terahertz spectrum test, which may otherwise affect the test result.

9 Claims, 2 Drawing Sheets

TERAHERTZ SPECTRUM TEST DEVICE AND SYSTEM

CROSS-REFERENCE TO RELATED APPLICATIONS

This application claims priority under 35 U.S.C. § 119(b) to Chinese Application No. 201811601929.4, filed Dec. 26, 2018, the disclosure of which is incorporated by reference herein in its entirety.

TECHNICAL FIELD

This application relates to the technical field of spectrum test, and in particular, to a terahertz spectrum test device and system.

BACKGROUND

Terahertz time-domain spectral analysis technology is a technology used to generate and test a time-resolved terahertz electric field by femtosecond pulses, obtain frequency-domain spectrum information of a tested object by Fourier transformation, and then analyze and identify material structure view and physical property of the tested object according to the characteristic frequency. Because of the advantages of low energy, high safety, and high penetrability of terahertz waves, the Terahertz time-domain spectral analysis technology has been widely applied to the fields of chemical materials, biomedicine, food detection, oil exploration, and safety inspection.

When testing a sample by terahertz waves, traditional terahertz spectrum test device are used to fix the to-be-tested sample with a clamp or other instruments first and then test the sample by terahertz waves. Test results obtained by the traditional terahertz spectrum test devices are generally influenced by the instruments used for fixing the to-be-tested sample, and thus are low in accuracy.

SUMMARY

In view of this, it is necessary to provide a terahertz spectrum test device and system to solve the problem of low accuracy of test results in traditional terahertz spectrum test devices.

A terahertz spectrum test device comprises a femtosecond fiber laser, a terahertz transmitter, a sample suspension device and a terahertz detector, wherein the sample suspension device is arranged between the terahertz transmitter and the terahertz detector, the terahertz detector is connected to an external signal processing circuit, the femtosecond fiber laser is configured to generate a pump light and a probe light, wherein the pump light is transmitted to the terahertz transmitter and the probe light is transmitted to the terahertz detector; the terahertz transmitter is configured to generate terahertz waves according to the pump light and transmit the terahertz waves to the sample suspension device, the sample suspension device is configured to suspend a to-be-tested sample to make sure that the terahertz waves irradiate the to-be-tested sample, and the terahertz detector is configured to receive the probe light and the terahertz waves and transmit the terahertz waves and the probe light to the external signal processing circuit.

In one embodiment, the terahertz transmitter comprises an optical delay line, a first optical fiber coupler and a terahertz transmitting antenna, wherein the first optical fiber coupler is connected to the terahertz transmitting antenna through an optical fiber, the optical delay line is configured to receive the pump light, delay the pump light, and then transmit the pump light to the terahertz transmitting antenna through the first optical fiber coupler, and the terahertz transmitting antenna is configured to generate terahertz waves and transmit the terahertz waves to the sample suspension device.

In one embodiment, the optical delay line comprises a voice coil motor, a first reflector and a second reflector, wherein the first reflector and the second reflector are oppositely arranged on the voice coil motor.

In one embodiment, the terahertz transmitter further comprises a third reflector, a fourth reflector and a first off-axis parabolic mirror, wherein the third reflector and the fourth reflector are arranged on a light path between the femtosecond fiber laser and the optical delay line and are configured to reflect the pump light to the optical delay line, and the first off-axis parabolic mirror is arranged on a light path between the terahertz transmitting antenna and the sample suspension device and is configured to reflect the terahertz waves to the to-be-tested sample.

In one embodiment, the sample suspension device is an ultrasonic suspension instrument.

In one embodiment, a gas inlet is formed in a cavity wall of the ultrasonic suspension instrument.

In one embodiment, the terahertz detector comprises a second optical fiber coupler, a second off-axis parabolic minor, and a terahertz receiving antenna, wherein the second optical fiber coupler is connected to the terahertz receiving antenna through an optical fiber, the terahertz receiving antenna is connected to the external signal processing circuit, the second optical fiber coupler is configured to receive the probe light and transmit the probe light to the terahertz receiving antenna; the second off-axis parabolic mirror is configured to reflect the terahertz waves to the terahertz receiving antenna, and the terahertz receiving antenna is configured to receive the terahertz waves and the probe light and transmit the terahertz waves and the probe light to the external signal processing circuit.

In one embodiment, the common focus of the first off-axis parabolic mirror and the second off-axis parabolic mirror is inside the sample suspension device, and the to-be-tested sample is suspended at the common focus.

In one embodiment, the terahertz detector further comprises a fifth reflector and a sixth reflector, wherein the fifth reflector and the sixth reflector are arranged on a light path between the femtosecond laser device and the second optical fiber coupler and are configured to reflect the probe light to the second optical fiber coupler.

A terahertz spectrum test system comprises a signal processing circuit and the terahertz spectrum test device, wherein the signal processing circuit is connected to the terahertz detector.

According to the terahertz spectrum test device and system, the femtosecond fiber laser generates a pump light and a probe light, the pump light excites the terahertz transmitter to generate terahertz waves which are transmitted to the sample suspension device to irradiate the suspended to-be-tested sample, and the probe light is directly transmitted to the terahertz detector. The terahertz detector receives the terahertz waves transmitted from the sample suspension device, and then the terahertz waves and the probe light are transmitted to the signal processing circuit to obtain a corresponding terahertz time-domain spectrum. By adoption of the terahertz spectrum test device and system, the to-be-tested sample need not to be fixed with a clamp or other instruments, so that terahertz waves will not irradiate to the instrument used for fixing the to-be-tested sample during a terahertz spectrum test, which may otherwise affect the test result. Compared with traditional terahertz spectrum test devices, the terahertz spectrum test device and system of this invention have the advantage of high test accuracy.

DETAILED DESCRIPTION OF EMBODIMENTS

For the sake of a better understanding to this application, this application is more comprehensively described below with reference to related accompanying drawings. Preferred embodiments of this application are shown in the accompanying drawings. However, this application can be implemented in different forms and is not limited to the embodiments described in this application. In fact, these embodiments are provided herein for a more thorough understanding to the contents disclosed by this application.

Figure 1:
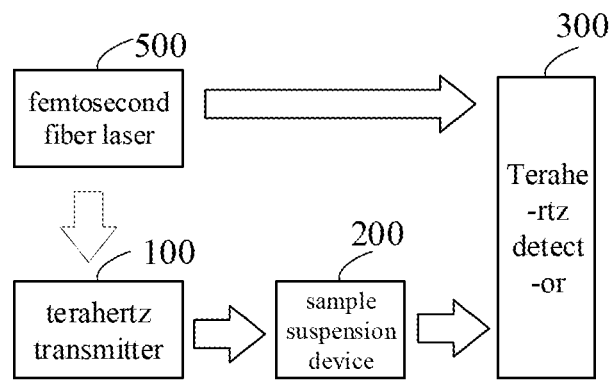
FIG. 1 is a structural diagram of a terahertz spectrum test device according to one embodiment.

Referring to FIG. 1, a terahertz spectrum test device comprises a femtosecond fiber laser 500, a terahertz transmitter 100, a sample suspension device 200 and a terahertz detector 300, wherein the sample suspension device 200 is arranged between the terahertz transmitter 100 and the terahertz detector 300, the terahertz detector 300 is connected to an external signal processing circuit, and the femtosecond fiber laser 500 is used to generate a probe light to be transmitted to the terahertz detector 200 and a pump light to be transmitted to the terahertz transmitter 100. The terahertz transmitter 100 is used to generate terahertz waves according to the pump light and transmit the terahertz waves to the sample suspension device 200. The sample suspension device 200 is used to suspend a to-be-tested sample to make sure that the terahertz waves irradiate the to-be-tested sample. The terahertz detector 300 is used to receive the probe light and the terahertz waves and transmit the terahertz waves and the probe light to the external signal processing circuit.

Specifically, the femtosecond fiber laser 500 is a laser device capable of generating femtosecond lasers, wherein femtosecond, abbreviated as fs, is a unit for measuring the length of time, and femtosecond lasers are lasers with the pulse reaching the femtosecond level. The femtosecond fiber laser 500 generates the pump light and the probe light, and after the pump light is transmitted to the terahertz transmitter 100, the terahertz transmitter 100 can generate and radiate terahertz waves according to the pump light. It should be noted that, in one embodiment, the femtosecond fiber laser 500 generates a laser beam first, and then the laser beam is split by a beam splitter into two beams of light, namely the pump light and the probe light, so that a terahertz spectrum test can be subsequently carried out on the sample according to the pump light and the probe light. The case where the laser generated by the femtosecond fiber laser 500 is split by the beam splitter into the pump light and the probe light is explained and described in detail below. Terahertz waves are electromagnetic waves with a frequency from 0.1 THz to 10 THz and a wavelength between microwave and infrared wave, from about 0.03 mm to 3 mm and. When using a traditional terahertz spectrum test device to test a solid sample, the sample needs to be pressed first and is then fixed with a clamp or a clamping groove to be placed in a sample chamber of a terahertz spectrum test instrument. Afterwards, the samples are irradiated with terahertz waves, and finally, a terahertz time-domain spectrum of the sample is obtained by processing according to the terahertz waves and the probe light to obtain. For a liquid sample, the liquid sample is generally placed in a sample pool, and then the sample pool containing the to-be-tested sample is placed in the sample chamber of the terahertz spectrum instrument for implementing a terahertz spectrum test. Due to the high penetrability of the terahertz waves, the terahertz waves may be affected by the clamp or the sample pool when the to-be-tested sample is irradiated with the terahertz waves, and consequentially, the accuracy of an obtained terahertz time-domain spectrum is low. In this embodiment, the sample suspension device 200 is adopted to suspend the to-be-tested sample to prevent the to-be-tested sample from contacting with other articles, so when a terahertz light is emitted to the to-be-tested sample, only the to-be-tested sample will be irradiated. After being received by the terahertz detector 300, the terahertz waves and the probe light are transmitted to the signal processing circuit for further processing to obtain a terahertz time-domain spectrum of the to-be-tested sample, so that it is guaranteed that the obtained terahertz time-domain spectrum only involves the to-be-tested sample. Thus, compared with the traditional terahertz spectrum test device, the terahertz spectrum test device of the invention has the advantage of high test accuracy In one embodiment, referring to FIG. 2, the sample suspension device 200 is an ultrasonic suspension instrument. Specifically, the ultrasonic suspension instrument generates a vertical suspension force under the interaction between a standing-wave acoustic field and an object to overcome the weight of the object and synchronously generates a horizontal positioning force to fix the object to an acoustic pressure wave node. The ultrasonic suspension technique includes triple-axis ultrasonic suspension and single-axis ultrasonic suspension, wherein in the case of triple-axis ultrasonic suspension, a series of standing waves are separately excited in three orthogonal directions in space to control the position of the object, while in the case of single-axis ultrasonic suspension, a series of standing waves are generated only in a vertical direction, and the suspension positioning force is provided by a certain mode acoustic field excited by a cylindrical resonant cavity. The ultrasonic suspension instrument is located between the terahertz transmitter 100 and the terahertz detector 300 and is used to suspend the to-be-tested sample, which is then irradiated with terahertz waves for a terahertz spectrum test. The ultrasonic suspension instrument has no special requirement for the electromagnetic property of the to-be-tested sample and has the advantages of stable suspension and easy to control. It should be noted that, ultrasonic suspension instrument can suspend particles of different volumes and with different diameters under different frequencies. For example, under the ultrasonic frequency of 58 kHz, the optimum diameter of suspended particles is 2.4 mm, and the optimum volume is 5 uL; and under the ultrasonic frequency of 100 kHz, the optimum diameter of suspended particles is 1.4 mm, and the optimum volume is 1 uL. It can be understood, that in other embodiments, the sample suspension device 200 can be other suspension devices, such as a magnetic suspension device, an optical suspension device, an electrostatic suspension device, or a pneumatic suspension device, as long as the suspension devices can suspend the to-betested sample to prevent the to-be-tested sample from contacting with other objects in the terahertz spectrum test. The suspension device is selected specifically according to the type of the to-be-tested sample.

Figure 2:
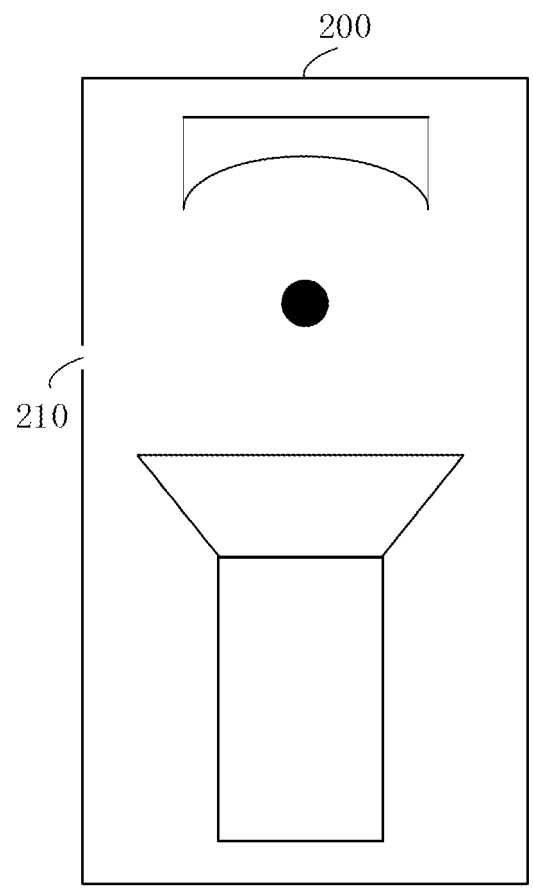
FIG. 2 is a structural diagram of an ultrasonic suspension instrument according to one embodiment.

Furthermore, in one embodiment, a gas inlet 210 is formed in a cavity wall of the ultrasonic suspension instrument, as shown in FIG. 2. Specifically, dry gas is injected into a cavity of the ultrasonic suspension instrument via the gas inlet 210 of the ultrasonic suspension instrument, and the temperature in the cavity is kept constant, so that the space where to-be-tested sample located is dry and has constant temperature. As such, the influences of moisture and oxygen in air and the ambient environment on the to-be-tested sample are avoided, which further guarantee the test accuracy of the terahertz spectrum test device.

Figure 3:
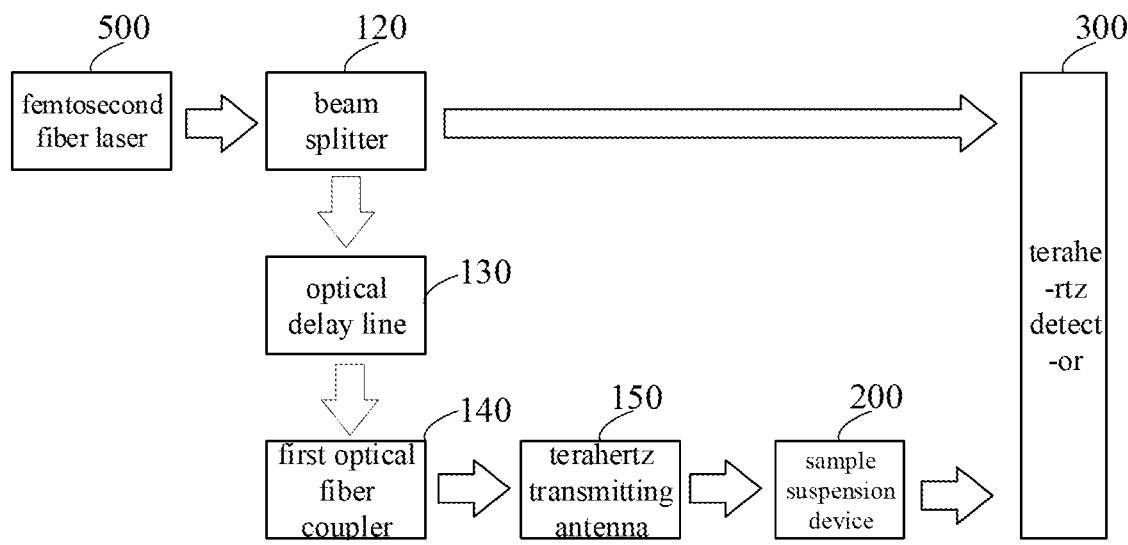
FIG. 3 is a structural diagram of the terahertz spectrum test device according to another embodiment.

In one embodiment, referring to FIG. 3, the terahertz transmitter 100 comprises an optical delay line 130, a first optical fiber coupler 140 and a terahertz transmitting antenna 150, wherein the first optical fiber coupler 140 is connected to the terahertz transmitting antenna 150 through an optical fiber. The optical delay line 130 is used to receive the pump light, delay the pump light, and then transmit the pump light to the terahertz transmitting antenna 150 through the first optical fiber coupler 140. The terahertz transmitting antenna 150 is used to generate terahertz waves and transmit the terahertz waves to the sample suspension device 200.

Specifically, after the femtosecond fiber laser 500 generates a laser, the laser is split by a beam splitter 120 into a pump light and a probe light. The beam splitter 120 is formed by coating the surface of optical glass with one or a plurality of layers of film. After being projected onto the film-coated glass, the laser beam is split into two or more beams by reflection and refraction. The laser generated by the femtosecond fiber laser 500 is split by the beam splitter 120 into two laser beams, one laser beam is the probe light which is directly transmitted to the terahertz detector 300, and the other laser beam is the pump light which is used to excite terahertz waves The to-be-tested sample is irradiated with the terahertz waves for the time-domain spectrum test. The pump light collects light beams transmitted in a free space through the first optical fiber coupler 140 and couples the light beams into the optical fiber for transmission. After being transmitted out of the beam splitter 120, the pump light is delayed by the optical delay line 130, so that the time delay between the pump light and the probe light is changed. Then the pump light is coupled by the first optical fiber coupler 140 to transmit to the terahertz transmitting antenna 150. The pump light excites the terahertz transmitting antenna 150 to generate terahertz waves which are in turn transmitted by the terahertz transmitting antenna 150 to the sample suspension device 200, and the terahertz time-domain spectrum of the to-be-tested sample is obtained.

Figure 4:
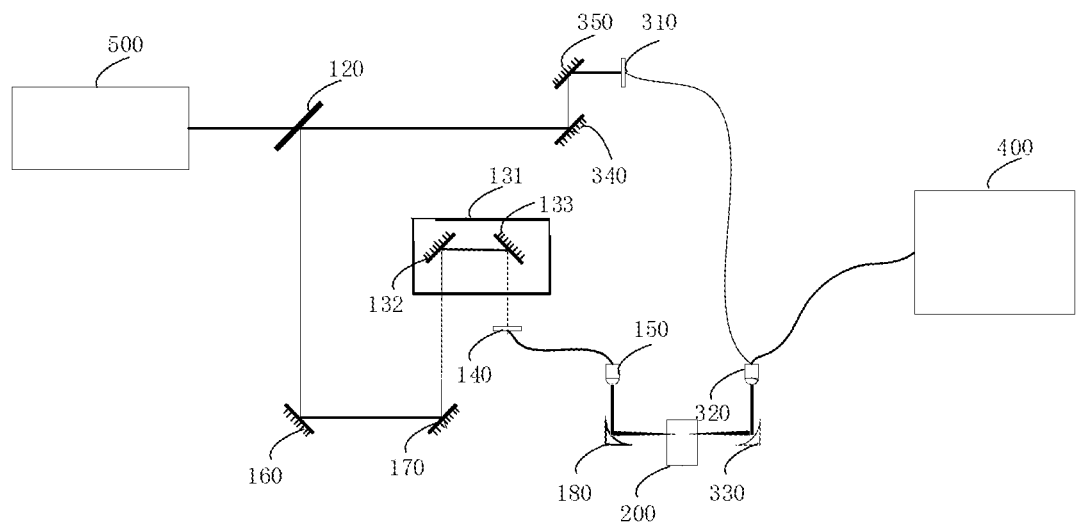
FIG. 4 is a structural diagram of the terahertz spectrum test device according to yet another embodiment.

In one embodiment, referring to FIG. 4, the optical delay line 130 comprises a voice coil motor 131, a first reflector 132 and a second reflector 133, wherein the first reflector 132 and the second reflector 133 are oppositely arranged on the voice coil motor 131.

Specifically, the optical delay line 130, namely an optical delay system, comprises the voice coil motor 131 and the two reflectors, wherein the voice coil motor 131 is to carry out equivalent time sampling to obtain a corresponding terahertz time-domain signal. The first reflector 132 and the second reflector 133 are arranged at the end of the voice coil motor 131 close to the beam splitter 120, and are used to change the time delay between the pump light and the probe light after beam splitting of the beam splitter 120. Dynamic scanning is carried out by the voice coil motor 131 to realize equivalent time sampling of the terahertz signal. Because the terahertz time-domain electric field signal is roughly on a picosecond level or is even shorter and the rising edge of the current response time is generally on a subpicosecond level, the signal cannot be detected by a common current detector, and an equivalent time sampling technique needs to be adopted to extract the terahertz time-domain electric field signal. The pump light and the probe light are both femtosecond pulse sequence and can last for a time much shorter than that of terahertz pulse, and a high-frequency fast signal can be converted into a low-frequency slow signal by changing the time delay between the two pulses; and sampling is carried out in each or every several cycles of repetitive signals, a plurality of sampling points are selected from different positions of each input signal to form a cycle, and a waveform similar to one cycle of the terahertz signal is formed to obtain a terahertz time-domain waveform. It should be noted that, in one embodiment, the first reflector 132 and the second reflector 133 are both planar reflectors. It can be understood that, in other embodiments, the first reflector 132 and the second reflector 133 can also be reflectors of other types, such as spherical reflectors, as long as light path delay can be realized. The number of the reflectors is not unique. For example, in one embodiment, three or more reflectors can be configured as long as optical delay of the pump light can be realized.

Furthermore, in one embodiment, referring to FIG. 4, the terahertz transmitter 100 further comprises a third reflector 160, a fourth reflector 170, and a first off-axis parabolic mirror 180, wherein the third reflector 160 and the fourth reflector 170 are arranged on a light path between the femtosecond fiber laser 500 and the optical delay line 130 and are used to reflect the pump light to the optical delay line 130. The first off-axis parabolic mirror 180 is arranged on a light path between the terahertz transmitting antenna 150 and the sample suspension device 200 and is used to reflect terahertz waves to the to-be-tested sample.

Specifically, the pump light and the probe light, which are formed by splitting a laser generated by the femtosecond fiber laser 500 through the beam splitter 120, are to be transmitted to different devices separately. Because the pump light and the probe light cannot be directly transmitted to the corresponding devices synchronously through the beam splitter 120, a reflector need to be configured on a light path between the beam splitter 120 and the optical delay line 130 to reflect the pump light, so that the pump light can be accurately transmitted to the optical delay line 130. The light path between the femtosecond fiber laser 500 and the optical delay line 130 is the light path between the beam splitter 120 and the optical delay line 130. In this embodiment, two reflectors, namely the third reflector 160 and the fourth reflector 170, are configured. It can be understood that, in other embodiments, three or more reflectors can be configured as long as optical delay of the pump light can be realized. It should be noted that, in one embodiment, the third reflector 160 and the fourth reflector 170 are both planar reflectors. It can be understood that in other embodiments, the reflectors can also be reflectors of other types, such as spherical reflectors, as long as light path delay can be realized. Similarly, to make sure that the terahertz waves emitted by the terahertz transmitting antenna 150 can be transmitted to the sample suspension device 200 to irradiate to the surface of the suspended to-be-tested sample, a corresponding reflection device needs to be configured to reflect the terahertz waves, and in this embodiment, the off-axis parabolic minor is adopted to reflect the terahertz waves.

In one embodiment, as shown in FIG. 4, the terahertz detector 300 comprises a second optical fiber coupler 310, a second off-axis parabolic mirror 330 and a terahertz receiving antenna 320, wherein the second optical fiber coupler 310 is connected to the terahertz receiving antenna 320 through an optical fiber, the terahertz receiving antenna 320 is connected to the external signal processing circuit, and the second optical fiber coupler 310 is used to receive the probe light and transmit the probe light to the terahertz receiving antenna 320; the second off-axis parabolic mirror 330 is used to reflect the terahertz waves to the terahertz receiving antenna 320; and the terahertz receiving antenna 320 is used to receive the terahertz waves and the probe light and transmit the terahertz waves and the probe light to the external signal processing circuit.

Similarly, to make sure that the terahertz waves can be received by the terahertz receiving antenna 320 after irradiating to the to-be-tested sample, the parabolic mirror is arranged between the sample suspension device 200 and the terahertz receiving antenna 320. The terahertz waves, after irradiating to the to-be-tested sample and being emitted by the sample suspension device 200, are reflected by the second off-axis parabolic mirror 330 to transmit to the terahertz receiving antenna 320. The probe light, after beam splitting of the beam splitter 120, is received by the second optical fiber coupler 310 and is then transmitted to the terahertz receiving antenna 320 through the optical fiber, and the probe light excites photoconductive materials in the terahertz receiving antenna 320 to generate carriers. These carriers are driven by a terahertz electric field to move directionally to form a light current between antenna electrodes, the magnitude of the light current is in direct proportion to the intensity of the terahertz electric field. The time delay between the probe light and the pump light is changed by the optical delay line 130, so that the terahertz time-domain electric field signal can be obtained by the equivalent time sampling technique.

It should be noted that in one embodiment, the common focus of the first off-axis parabolic mirror 180 and the second off-axis parabolic mirror 330 is inside the sample suspension device 200, and the to-be-tested sample is suspended at the common focus.

Specifically, in this embodiment, the to-be-tested sample is placed at the common focus of the first off-axis parabolic mirror 180 and the second off-axis parabolic mirror 330, so that the reflected terahertz waves are exactly focused on the to-be-tested sample, and hence the terahertz spectrum test efficiency is effectively improved. For example, if the to-be-tested sample is a liquid, during the testing process, the to-be-tested sample is moved by a proper measuring range pipette to the common focus, inside the sample suspension device 200, of the first off-axis parabolic mirror 180 and the second off-axis parabolic mirror 330, and then a terahertz spectrum test is carried out on the to-be-tested liquid. It can be understood that similar to the liquid sample, to-be-tested samples of other types can be moved by a proper device to the common focus of the first off-axis parabolic mirror 180 and the second off-axis parabolic mirror 330 for terahertz spectrum test.

In one embodiment, referring to FIG. 4, the terahertz detector 300 further comprises a fifth reflector 340 and a sixth reflector 350, wherein the fifth reflector 340 and the sixth reflector 350 are arranged on a light path between the femtosecond fiber laser 500 and the second optical fiber coupler 310 and are used to reflect the probe light to the second optical fiber coupler 310.

Specifically, similar to the terahertz transmitter 100, the pump light and the probe light formed after beam splitting of the beam splitter 120 are transmitted to different devices separately. Because the pump light and the probe light cannot be directly transmitted to the corresponding devices synchronously through the beam splitter 120, reflectors need to be configured on the light path between the beam splitter 120 and the second optical fiber coupler 310 to make sure that the probe light can be accurately transmitted to the second optical fiber coupler 310. The light path between the femtosecond fiber laser 500 and the second optical fiber coupler 310 is the light path between the beam splitter 120 and the second optical fiber coupler 310. It can be understood that, in other embodiments, three or more reflectors can be configured as long as the probe light can be reflected to the second optical fiber coupler 310. It should be noted that, in one embodiment, the fifth reflector 340 and the sixth reflector 350 are both planar reflectors. It can be understood that, in other embodiments, the fifth reflector 340 and the sixth reflector 350 can also be reflectors of other types, such as spherical reflectors, as long as the probe light can be reflected to the second optical fiber coupler 310.

According to the terahertz spectrum test device, the femtosecond fiber laser generates a pump light and a probe light, the pump light excites the terahertz transmitter to generate terahertz waves which are transmitted to the sample suspension device to irradiate the suspended to-be-tested sample, and the probe light is directly transmitted to the terahertz detector. The terahertz detector receives the terahertz waves transmitted from the sample suspension device, and then the terahertz waves and the probe light are transmitted to the signal processing circuit to obtain a corresponding terahertz time-domain spectrum. By adoption of the terahertz spectrum test device, the to-be-tested sample need not to be fixed with a clamp or other instruments, so that terahertz waves will irradiate the instrument used for fixing the to-be-tested sample in a terahertz spectrum test, which may otherwise affect the test result. Compared with traditional terahertz spectrum test devices, the terahertz spectrum test device of the invention has the advantage of high test accuracy.

Referring to FIG. 4, a terahertz spectrum test system comprises a signal processing circuit 400 and the terahertz spectrum test device in any one embodiment mentioned above, wherein the processing circuit 400 is connected to the terahertz detector 300.

Specifically, the terahertz spectrum test device comprises a femtosecond fiber laser 500, a terahertz transmitter 100, a sample suspension device 200 and a terahertz detector 300. A laser generated by the femtosecond fiber laser 500 is split by a beam splitter 120 into a pump light and a probe light. The terahertz transmitter 100 can generate and transmit terahertz waves according to the pump light, and the terahertz waves are electromagnetic waves with a frequency from 0.1 THz to 10 THz and a wavelength between microwave and infrared wave, from about 0.03 mm to 3 mm and. When using a traditional terahertz spectrum test device to test a solid sample, the sample needs to be pressed first and then is fixed with a clamp or a clamping groove to be placed in a sample chamber of a terahertz spectrum test instrument, afterwards, terahertz waves are irradiated to the sample, and finally, a terahertz time-domain spectrum of the sample is obtained by processing according to the terahertz waves and the probe light. For a liquid sample, the liquid sample is generally placed in a sample pool, and then the sample pool containing the to-be-tested sample is placed in the sample chamber of the terahertz spectrum instrument for implementing a terahertz spectrum test. Because of the high penetrability of terahertz waves, the terahertz waves may be affected by the clamp or the sample pool when the to-be-tested sample is irradiated with the terahertz waves, and consequentially, the accuracy of an obtained terahertz time-domain spectrum is low.

The femtosecond fiber laser 500 is a laser device capable of generating femtosecond lasers, wherein femtosecond, abbreviated as fs, is a unit for measuring the length of time, and femtosecond lasers are lasers with the pulse reaching the femtosecond level. The beam splitter 120 is formed by coating the surface of optical glass with one or a plurality of layers of film, and after being projected onto the film-coated glass, a laser beam is split into two or more beams by reflection and refraction. A laser generated by the femtosecond fiber laser 500 is split by the beam splitter 120 into two laser beams, one laser beam is the probe light which is directly transmitted to the terahertz detector 300, and the other laser beam is the pump light which is used to excite terahertz waves. The to-be-tested sample is irradiated with the terahertz waves for the time-domain spectrum test.

In this embodiment, the sample suspension device 200 is adopted to suspend the to-be-tested sample to prevent the to-be-tested sample from contacting with other articles, so when a terahertz light is emitted to the to-be-tested sample, only the to-be-tested sample will be irradiated. After being received by the terahertz detector 300, the terahertz waves and the probe light are transmitted to the signal processing circuit 400 for further processing to obtain a terahertz time-domain spectrum of the to-be-tested sample, and a terahertz frequency-domain spectrum is obtained through Fourier transform to realize frequency-domain spectrum analysis of the to-be-tested sample, so that it is guaranteed that the obtained terahertz frequency-domain spectrum only involves the to-be-tested sample. Thus, compared with the traditional terahertz spectrum test device, the terahertz spectrum test device of the invention has the advantage of high test accuracy.

According to the terahertz spectrum test system, the femtosecond fiber laser generates a pump light and a probe light, the pump light excites the terahertz transmitter to generate terahertz waves which are transmitted to the sample suspension device to irradiate the suspended to-be-tested sample, and the probe light is directly transmitted to the terahertz detector. The terahertz detector receives the terahertz waves transmitted from the sample suspension device, and then the terahertz waves and the probe light are transmitted to the signal processing circuit to obtain a corresponding terahertz time-domain spectrum. By adoption of the terahertz spectrum test system, the to-be-tested sample need not to be fixed with a clamp or other instruments, so that terahertz waves will not irradiate the instrument used for fixing the to-be-tested sample in a terahertz spectrum test, which may otherwise affect the test result. Compared with traditional terahertz spectrum test devices, the terahertz spectrum test system of the invention has the advantage of high test accuracy.

The technical characteristics of the above embodiments can be arbitrarily combined. For the sake of a brief description, not all possible combinations of the technical characteristics of the embodiments are described. However, all these possible combinations obtained without causing a contradiction should fall within the scope of the specification.

The embodiments which are specifically detailed above are only some illustrative possibilities of this application, and should not be interpreted as limitations of the scope of this application. It should be noted that various transformations and improvements can be made by those ordinarily skilled in the art without deviating from the concept of this application, and all these transformations and improvements should also fall within the protection scope of this application. Therefore, the patent protection scope of this application should be subject to the appended claims.

What is claimed is:

1. A terahertz spectrum test device, comprising a femtosecond fiber laser, a terahertz transmitter, a sample suspension device, and a terahertz detector, wherein the sample suspension device is arranged between the terahertz transmitter and the terahertz detector, and the terahertz detector is connected to an external signal processing circuit;

the femtosecond fiber laser is configured to generate a pump light and a probe light, the pump light is transmitted to the terahertz transmitter and the probe light is transmitted to the terahertz detector; the terahertz transmitter is configured to generate terahertz waves according to the pump light and transmit the terahertz waves to the sample suspension device; the sample suspension device is configured to suspend a to-be-tested sample so that the terahertz waves irradiate the to-be-tested sample; and the terahertz detector is configured to receive the probe light and the terahertz waves and transmit the terahertz waves and the probe light to the external signal processing circuit:

wherein the terahertz transmitter comprises an optical delay line, a first optical fiber coupler and a terahertz transmitting antenna, and the first optical fiber coupler is connected to the terahertz transmitting antenna through an optical fiber;

the optical delay line is configured to receive the pump light, delay the pump light, and then transmit the pump light to the terahertz transmitting antenna through the first optical fiber coupler, and the terahertz transmitting antenna is configured to generate terahertz waves and transmit the terahertz waves to the sample suspension device.

2. The terahertz spectrum test device according to claim 1, wherein the optical delay line comprises a voice coil motor, a first reflector and a second reflector, and the first reflector and the second reflector are oppositely arranged on the voice coil motor.

3. The terahertz spectrum test device according to claim 1, wherein the terahertz transmitter further comprises a third reflector, a fourth reflector, and a first off-axis parabolic mirror;

the third reflector and the fourth reflector are arranged on a light path between the femtosecond fiber laser and the optical delay line and are configured to reflect the pump light to the optical delay line; and the first off-axis parabolic mirror is arranged on a light path between the terahertz transmitting antenna and the sample suspension device and is configured to reflect the terahertz waves to the to-be-tested sample.

4. The terahertz spectrum test device according to claim 1, wherein the sample suspension device is an ultrasonic suspension instrument.

5. The terahertz spectrum test device according to claim 4, wherein a gas inlet is formed in a cavity wall of the ultrasonic suspension instrument.

6. The terahertz spectrum test device according to claim 4, wherein the terahertz detector comprises a second optical fiber coupler, a second off-axis parabolic mirror, and a terahertz receiving antenna, the second optical fiber coupler is connected to the terahertz receiving antenna through an optical fiber, and the terahertz receiving antenna is connected to the external signal processing circuit;

the second optical fiber coupler is configured to receive the probe light and transmit the probe light to the terahertz receiving antenna; the second off-axis parabolic mirror is configured to reflect the terahertz waves to the terahertz receiving antenna; and the terahertz receiving antenna is configured to receive the terahertz waves and the probe light and transmit the terahertz waves and the probe light to the external signal processing circuit.

7. The terahertz spectrum test device according to claim 6, wherein a common focus of the first off-axis parabolic mirror and the second off-axis parabolic mirror is inside the sample suspension device, and the to-be-tested sample is suspended at the common focus.

8. The terahertz spectrum test device according to claim 6, wherein the terahertz detector further comprises a fifth reflector and a sixth reflector;

the fifth reflector and the sixth reflector are arranged on a light path between the femtosecond fiber laser and the second optical fiber coupler and are configured to reflect the probe light to the second optical fiber coupler.

9. A terahertz spectrum test system, comprising a signal processing circuit and a terahertz spectrum test device according to claim 1, wherein the signal processing circuit is connected to the terahertz detector.

* * * * *